United States Patent Office 3,557,549
Patented Jan. 26, 1971

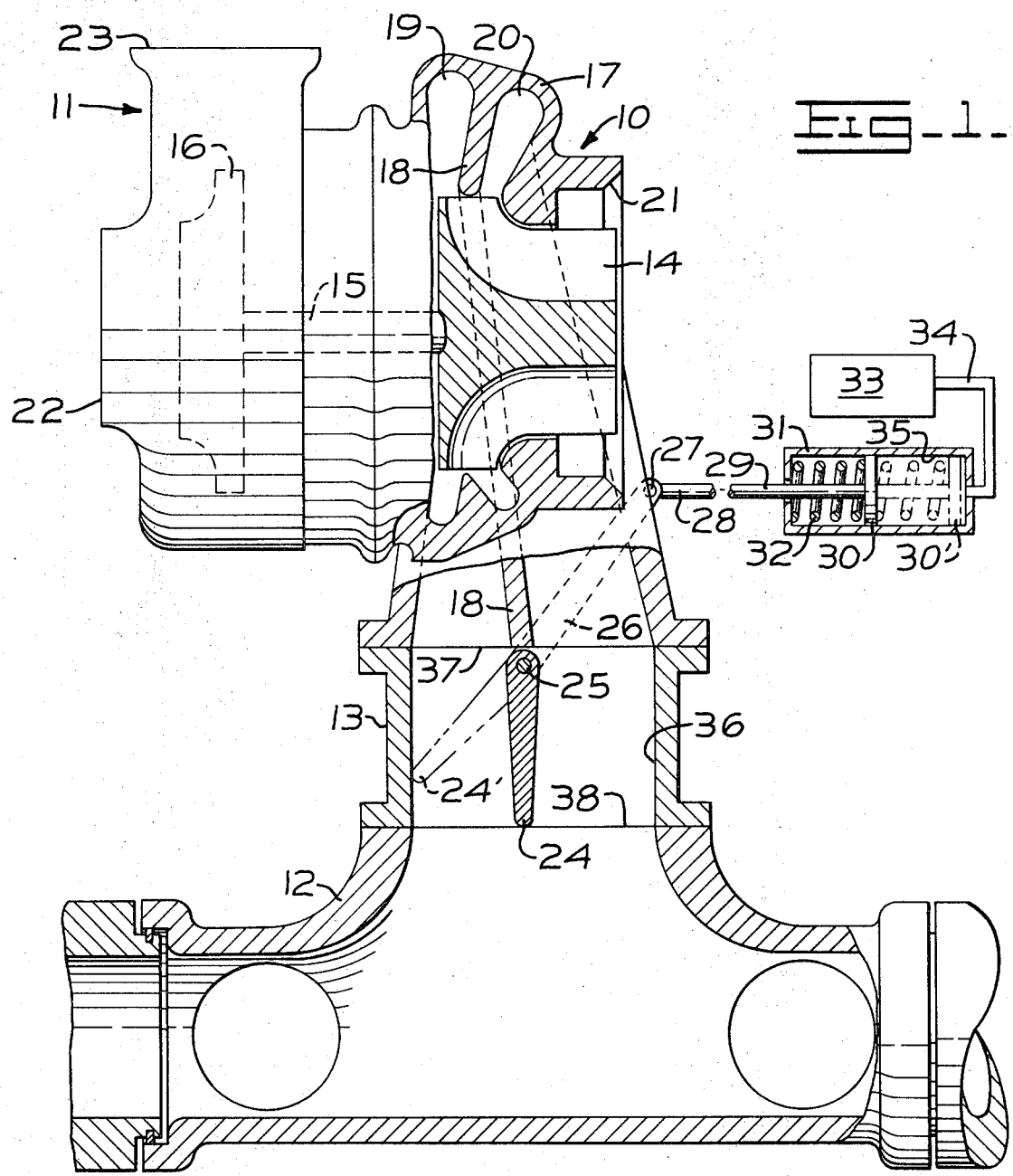

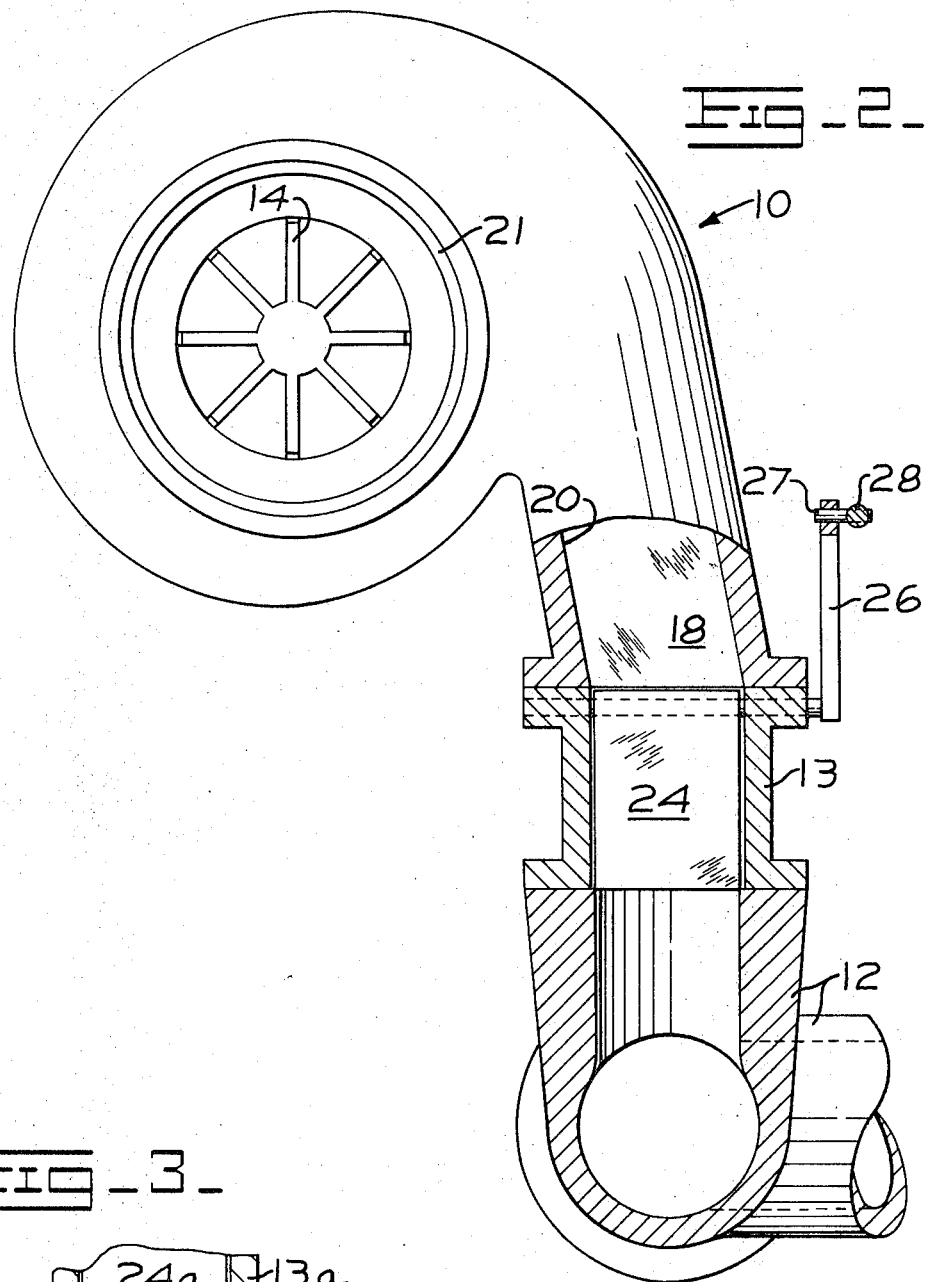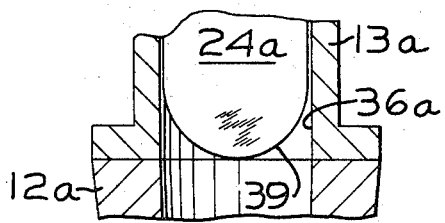

3,557,549
TURBOCHARGER SYSTEM FOR INTERNAL COMBUSTION ENGINE
Donald F. Webster, Peoria, Ill., assignor to Caterpillar Tractor Co., Peoria, Ill., a corporation of California
Filed Mar. 21, 1969, Ser. No. 809,447
Int. Cl. F02b 37/08
U.S. Cl. 60—13            7 Claims

ABSTRACT OF THE DISCLOSURE

A turbocharger comprises a turbine having an annular partition disposed in the housing thereof to divide the housing's chamber into two separate compartments. A flapper valve is pivotally mounted at the inlet to such housing and is normally positioned to be substantially coplanar with the partition to permit engine exhaust gases to flow into both compartments. During the idle phase of engine operation, for example, the flapper valve automatically pivots to block gas flow into one of the compartments and to direct all gas flow into the other compartment.

---

Conventional turbochargers are normally designed for efficient operation within a predetermined range of engine operation. When the engine operates outside of such a range, the magnitude of the engine exhaust gas energy oftentimes falls below a level required for driving the turbocharger efficiently. For example, during idle and low-speed phases of engine operation exhaust gas flow may be found insufficient to drive the turbocharger at the speed required for supplying the engine with the amount of air required to maintain proper engine performance.

An object of this invention is to overcome the above, briefly described problems by providing a non-complex and durable flapper-type control valve at the inlet of a turbocharger's turbine for efficiently driving the turbocharger during all phases of engine operation. The turbine comprises a housing having an annular partition disposed in a chamber thereof to divide the chamber into two annular compartments. The flapper valve is pivotally mounted at the turbine's inlet to be substantially coplanar with such partition during most phases of engine operation. However, during idle or low-speed operation, for example, such flapper valve is adapted to be pivoted to a position blocking entrance to one of the compartments. Thus, all engine exhaust gas flow will be directed to the other compartment for maintaining turbocharger speed at an acceptable and efficient level.

Other objects of this invention will become apparent from the following description and accompanying drawings wherein:

FIG. 1 is a partially sectioned, front elevational view of a turbocharger attached to the exhaust manifold of an engine and having a control valve embodiment of this invention mounted therein;

FIG. 2 is a partially sectioned, side elevational view of the FIG. 1 turbocharger and attendant structures; and FIGS. 3–6 are partially sectioned views disclosing additional control valve embodiments.

Figure 4:
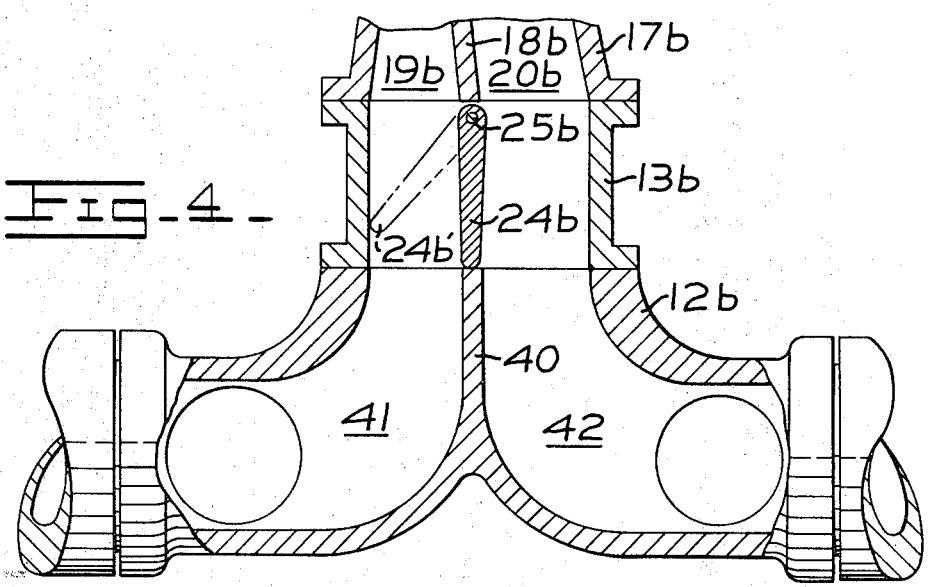

FIG. 1 illustrates a turbocharger comprising a turbine 10 and a compressor 11. The turbocharger may be suitably secured to an exhaust manifold 12 of an internal combustion engine by an adapter 13. The turbine comprises a rotor 14 secured to one end of a shaft 15, mounted for rotation about its longitudinal axis by suitable bearings. A compressor wheel 16 is secured to the other end of the shaft.

The turbocharger may be of the type disclosed in U.S. Pat. 3,270,495, assigned to the assignee of this application. In particular, the turbine comprises a stationary and preferably vaneless housing 17 having an annular partition 18 secured therein and disposed substantially perpendicular to the longitudinal axis of shaft 15. The turbine's scroll-type chamber is thus divided into two annular compartments 19 and 20 for directing exhaust gases from the exhaust manifold radially inwardly towards such longitudinal axis.

The gases then pass through the bladed passageways formed on the rotor and are exhausted through a circular outlet 21. The rotor functions to rotate shaft 15 and the compressor wheel to pump ambient air from an inlet 22 to an outlet 23. The outlet is adapted to be suitably attached to the intake manifold of an internal combustion engine to supply air thereto for combustion purposes.

During the critical idle and low-speed phases of engine operation, the speed of a conventional turbocharger normally tends to drop below a level required to assure proper engine performance. In order to maintain an appropriate turbocharger speed during all phases of engine operation, a flapper valve 24 is provided at the turbine's inlet. As will be hereinafter more fully described, the valve is adapted to be pivoted to its 24' position, during the above-mentioned critical phases of engine operation, to direct all gas flow into compartment 20.

The valve is pivotally mounted to adapter 13 by a pivot pin 25 to facilitate incorporation thereof into a conventional turbocharger system. A lever 26 (FIG. 2) is secured to the pivot pin and is preferably disposed exteriorly of the turbocharger. A pin 27 pivots the lever to a reciprocal rod 28, forming part of a control means for manually or automatically actuating the flapper valve.

When the flapper valve is adapted for automatic actuation, rod 28 may be mechanically connected by suitable linkage means (not shown) to a piston rod 29 having a head 30 secured to the other end thereof. The piston may be reciprocally mounted in a housing 31 having a coil spring 32 disposed therein to normally urge the piston head to its phantom lined position 30'. Reciprocation of the piston may be made responsive to a variable engine operating parameter, such as a pressurized fluid source schematically illustrated at 33.

Such source may comprise the variable air pressure prevalent in the engine's intake manifold or at the outlet 23 of compressor 11, for example. A conduit 34 may be operatively connected between source 33 and housing 31 to constantly communicate such varying air pressure to a chamber 35 formed at the head end of piston 30. Thus, when the air pressure in the engine's intake manifold drops below a predetermined level (during the idle or low-speed phase of engine operation) a corresponding pressure drop will occur in chamber 35.

Such pressure drop will permit compression spring 32 to move piston 30 rightwardly to its phantom lined position 30'. Such movement will in turn function to pivot flapper valve 24 to its phantom lined or blocking position 24' via rods 28 and 29, their intermediate linkage means, and lever 26. The flapper valve will thus prevent exhaust gases from flowing into chamber compartment 19 and direct all gas flow into compartment 20.

The restricted gas flow will tend to increase in velocity in substantial accordance with the basic formula $Q=AV$: wherein Q equals the quantity of gas flow; A equals the inlet area to the turbine, as dictated by the position of the flapper valve; and V equals the velocity of the gas flow. As a result, rotor 14 will be driven at a higher r.p.m. than would be achieved should both compartments be opened to the exhaust manifold.

It should be noted that the FIGS. 1 and 2 flapper valve embodiment comprises a rectangular configuration (FIG. 2) conforming to the configuration of a chamber 36 of adapter 13 which has a matching rectangular cross-section. Such rectangular cross-section matches the rectangular cross-sections formed by an inlet 37 of turbine housing 17 and by outlet 38 of the exhaust manifold. However, it should be understood that other matching configurations may be employed.

For example, FIG. 3 illustrates a modified embodiment wherein a chamber 36a of an adapter 13a comprises a circular cross-section, i.e., chamber 36a forms a right cylinder. A lower edge 39 of a flapper valve 24a may be suitably rounded to conform to the circular, inner wall portions of the adapter defining chamber 36a when the flapper valve is pivoted and engages therewith to close compartment 19.

It should be noted that the modified control valve embodiments, illustrated in FIGS. 3–6, have numerals common to FIGS. 1 and 2 (accompanied by subscripts a, b, c and d, respectively) to depict substantially identical structures. The additional structures shown in FIGS. 1 and 2, but not in FIGS. 3–6, would of course also be employed with the latter, four embodiments.

The FIG. 4 embodiment comprises a vertical baffle means 40 disposed substantially co-planar with respect to partition 18b and flapper valve 24b when the valve is maintained in its normal, non-pivoted position. A manifold portion 41 is thus maintained in closed communication with two exhaust ports of a four-cylinder, internal combustion engine, for example, whereas a manifold portion 42 is maintained in closed communication with the other two exhaust ports. Upon actuation of the flapper valve to its 24b' position, exhaust gases from all four exhaust ports will be communicated to only compartment 20b to increase turbine speed during the above-described critical phases of engine operation.

Figure 5:
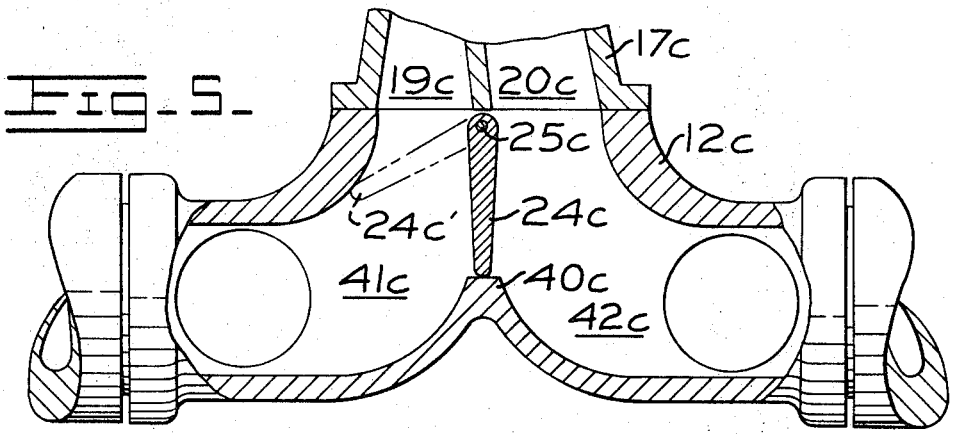

The FIG. 5 embodiment is similar to the one shown in FIG. 4 in that each exhaust manifold portion 41c and 42c is normally maintained in closed communication with one-half of the exhaust ports of the engine. However, it should be noted that no adapter is employed therewith, i.e., the outlet of the exhaust manifold is attached directly to the turbine's housing. In addition, a flapper valve 24c is pivotally mounted by a pivot pin 24c directly on the exhaust manifold.

Figure 6:
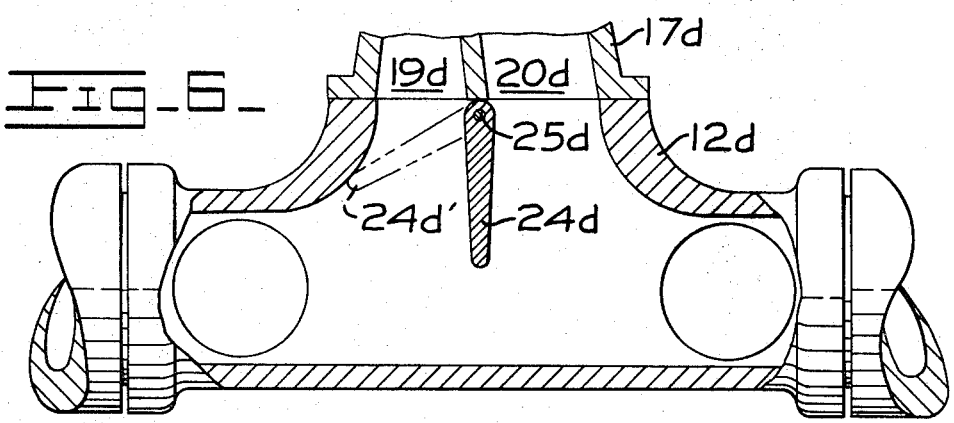

The FIG. 6 embodiment is similar to the FIG. 5 embodiment except that no baffle plate or means is employed in the exhaust manifold to normally divide the exhaust gas flow to the turbine into separate streams. In particular, all exhaust ports freely communicate with each other to intermingle the exhaust gases prior to when they are discharged into the turbine.

What is claimed is:

1. In a turbocharger system for an internal combustion engine comprising a turbine having a housing forming an inlet adapted to be attached to an engine's exhaust manifold, a rotor mounted in said housing for rotation about a longitudinal axis thereof and an annular partition disposed in a chamber of said housing to be substantially perpendicular relative to said housing to divide said chamber into two annular compartments, the invention comprising flapper valve means pivotally mounted closely adjacent to said partition at the inlet to said housing to normally be substantially co-planar with respect to and to form a continuation of said annular partition and control means for selectively pivoting said flapper valve to close the inlet to one of said compartments.

2. The invention of claim 1 further comprising an exhaust manifold of an internal combustion engine having an outlet thereof attached to said housing to communicate with the inlet thereof for communicating engine exhaust gases past said flapper valve means and to said annular compartments.

3. The invention of claim 2 further comprising an annular adapter attached between the inlet of said housing and the outlet of said exhaust manifold, said flapper valve means pivotally mounted on said adapter.

4. The invention of claim 2 wherein the outlet of said exhaust manifold is attached directly to the inlet of said housing, said flapper valve means pivotally mounted on said exhaust manifold.

5. The invention of claim 2 wherein said exhaust manifold comprises baffle means substantially co-planar with respect to said flapper valve means, when the latter is maintained in its normal position, to normally provide two separate manifold portions each arranged in closed communication with a respective one of said annular compartments.

6. The invention of claim 5 further comprising an annular adapter attached between the inlet of said housing and the outlet of said exhaust manifold, said flapper valve means pivotally mounted on said adapter.

7. The invention of claim 1 wherein said control means comprises means for automatically pivoting said flapper valve to close the inlet to one of said compartments in response to air pressure variations occurring in the intake manifold of an internal combustion engine.

References Cited

UNITED STATES PATENTS

| 1,816,787 | 7/1931 | Moss | 60—13 |
| 3,270,495 | 9/1966 | Connor | 60—13 |

FOREIGN PATENTS

| 953,933 | 4/1964 | Great Britain | 60—13 |
| 1,337,864 | 8/1963 | France | 60—13 |

DOUGLAS HART, Primary Examiner